United States Patent [19]
Ernst et al.

[11] Patent Number: 5,698,098
[45] Date of Patent: Dec. 16, 1997

[54] OIL FILTER HOUSING INCLUDING A VALVED DRAIN OPENING

[75] Inventors: Volker Ernst, Sachsenheim; Arthur Klotz, Remseck; Rudolf Leipelt, Marbach, all of Germany

[73] Assignee: Filterwerk Mann & Hummel GmbH, Ludwigsburg, Germany

[21] Appl. No.: 514,723

[22] Filed: Aug. 14, 1995

[30] Foreign Application Priority Data

Aug. 13, 1994 [DE] Germany ............. 44 28 771.2

[51] Int. Cl.⁶ .................................. B01D 35/30
[52] U.S. Cl. ............ 210/248; 210/428; 210/433.1; 210/435
[58] Field of Search ............... 210/248, 418, 210/433.1, 453, 435, 428

[56] References Cited

U.S. PATENT DOCUMENTS 4,036,755  7/1977  Dahm et al.
4,906,365  3/1990  Baumann et al. ............ 210/248
5,516,425  5/1996  Brieden et al. ............. 210/248
5,520,801  5/1996  Gerber et al. .............. 210/248

FOREIGN PATENT DOCUMENTS 2555420  4/1977  Germany.

Primary Examiner—Matthew O. Savage
Attorney, Agent, or Firm—Evenson, McKeown, Edwards & Lenahan P.L.L.C.

[57] ABSTRACT

A filter for cleaning lubricating oil of an internal combustion engine has a filter housing with an access opening on an upper side to insert and remove filter elements. A cover is arranged to close the access opening. The housing has an inlet opening for dirty fluid and an outlet opening for clean fluid. Furthermore, a drain opening is provided in the housing which can be opened and closed with a closure element. The closure element is operationally coupled to the cover such that when the cover is closed, the closure element closes the drain opening, and when the cover is opened, the closure element opens the drain opening, allowing the fluid to drain out of the housing.

3 Claims, 6 Drawing Sheets

OIL FILTER HOUSING INCLUDING A VALVED DRAIN OPENING

BACKGROUND OF THE INVENTION

This invention relates to a filter, particularly a filter for cleaning the lubricating oil of an internal combustion engine.

Dahm, German Patent No. DE 2,555,240 discloses a filter in which a housing is provided to accommodate at least one filter insert. The filter housing has an upper mounting opening for the insertion and replacement of the filter insert. In a lower section of the housing, an inlet for clean oil and an outlet for dirty oil are arranged, as well as another outlet serving as a drain outlet. The drain outlet is closed by a central bolt which runs through the filter insert and affixes a cover on the mounting opening. In order to replace the filter insert it is necessary to first unscrew the central bolt and then remove the cover. After the central bolt has been unscrewed from the drain outlet, the oil in the filter housing runs out through this drain outlet.

This system has long served well in the pressure-cast aluminum housings and covers that have been common up to now. As a result of reductions in materials and costs, however, plastic is being used increasingly as a material in filters. When plastic is used for the cover or for the filter housing the central bolt is no longer necessary.

A disadvantage of the known system is that the oil drains very slowly when the filter is opened. The oil cannot drain out until the central bolt is completely removed from the threads. If the cover is opened rapidly, the housing will still be filled with oil when the cover is removed.

SUMMARY OF THE INVENTION

An object of the present invention is to provide a filter for the lubricating oil of an internal combustion engine which has a drain outlet to allow the oil in the filter housing to readily drain away when the filter is changed, before the cover is completely removed.

This object has been achieved according to the present invention by providing a filter housing having an access opening to insert and remove a filter element, a cover arranged to close the access opening, an inlet for dirty oil, an outlet for clean oil, a drain opening, and a closure element which is coupled to the cover such that the closure element is moved to a closed position blocking the drain opening when the cover is closed, and the closure element is moved to an open position opening the drain opening when the cover is opened.

An advantage of the present invention is that a filter with a reliably operating bottom drain valve is created with few elements. The bottom drain valve is controlled by the opening of the cover such that, before the cover is completely removed, a large part of the oil in the filter housing will already have drained out. Another advantage of the invention is that no additional parts, such as a central bolt for example, are needed. Maintenance is thus considerably simplified.

In one advantageous embodiment the housing cover is provided with a multiple screw thread. This has the advantage that only a single rotation is needed in order to close the filter housing reliably.

In another advantageous embodiment of the invention a sliding valve is used to operate the drain opening. This sliding valve can be supported simply on the housing cover and can be operated by the axial movement of the cover along the filter axis to close or open the bottom drain opening.

In a particularly advantageous embodiment, this sliding valve is provided with a pin which engages a groove in the cover so that positive guidance is provided. If positive guidance is not given, the valve can be provided with a spring which biases the valve toward the cover, so that when the cover is removed the valve moves upward, thus opening the oil drain valve.

In another embodiment of the invention, the bottom drain valve is configured to close the drain opening over a range of axial positions. Therefore, variations in tolerances of the cover or valve will not affect the reliable operation of the valve. For this purpose the bottom drain valve has a specific sealing length. Within this sealing length a sealing bead, for example an O-ring of the valve, is positioned.

According to another embodiment of the invention the drain valve is equipped with a catch which becomes engaged in the open position. This assures that the valve will remain open when the cover is open.

These and additional features of preferred embodiments of the invention are found in the specification and the drawings. It is to be understood that the individual features may be implemented separately or in combination, and may represent advantageous as well as separately patentable constructions.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
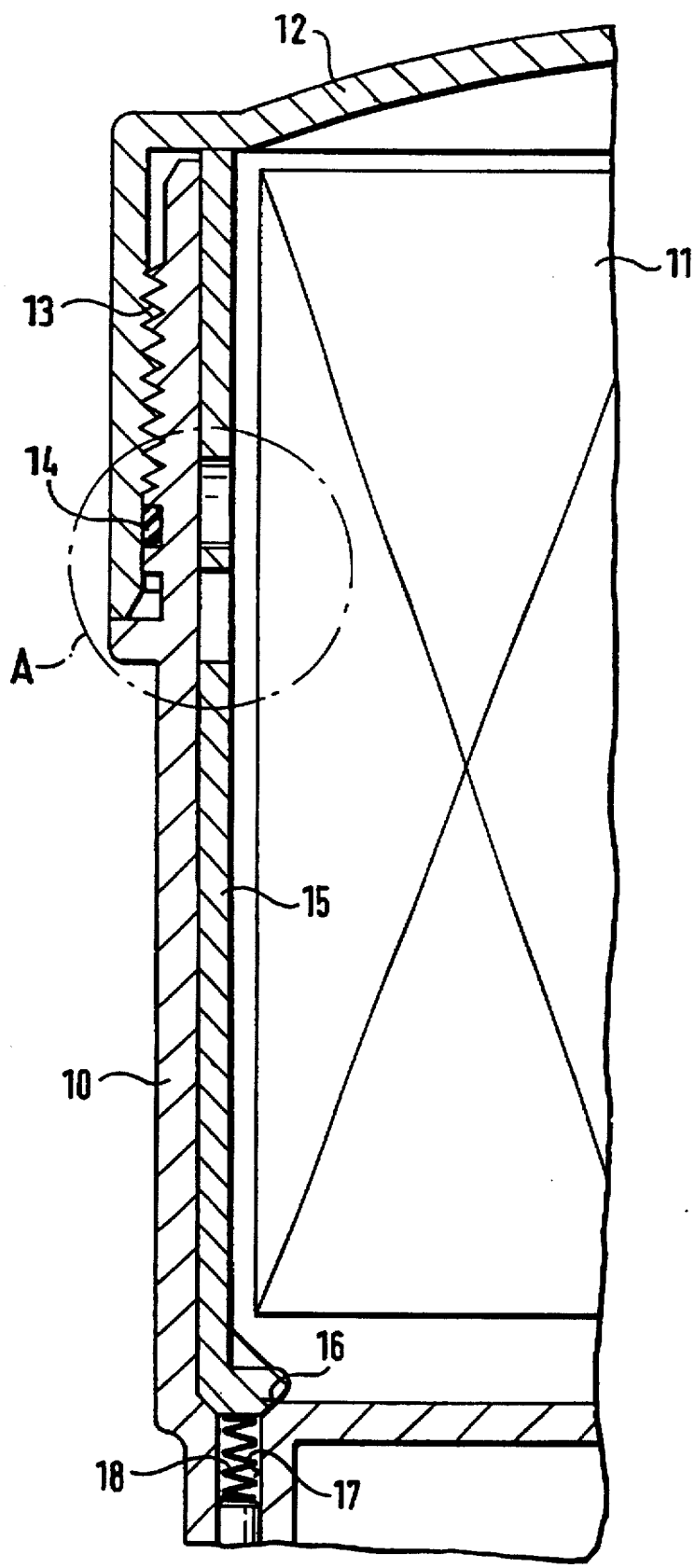
FIG. 1 is a sectional front view of a filter according to the present invention.

The cross-sectional view of a filter in FIG. 1 shows a filter housing 10 in which a filter element 11 is situated. The filter housing is closed at the top end by means of a threaded connection 13 with the cover 12. A sealing ring 14 is arranged in an area near the threads 13 to provide a sealing connection between the filter housing and the cover. A sliding valve 15 is held against the cover 12. This sliding valve is mounted in an axially movable manner on the filter housing 10.

The sliding valve is equipped at the bottom end with a valve seat 16. In its operating state this valve seat closes an oil drain opening 17. As soon as the cover is unscrewed from the filter housing 10 the sliding valve 15 is shifted upward by the force of the compression spring 18 and thus opens the oil drain opening so that the oil in the filter housing can drain out. After the cover is removed the filter element 11 can be removed and replaced with a new filter element. To compensate for axial tolerances of the sliding valve 15, a resilient means is necessary to maintain the sliding valve in the closed position. This resilient means can be a coil spring integrated in the sliding valve 15 or a ring or shank formed on the sliding valve.

Figure 1A:
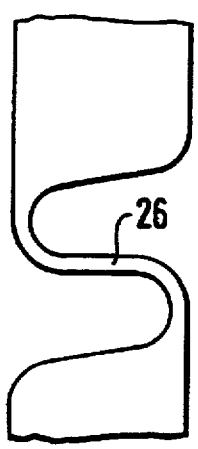
FIGS. 1a–1e are side views of various configurations of sliding valves.

FIG. 1a shows a side view of the detail area A of the sliding valve of FIG. 1. In this view an over-expansion spring 26 is shown. It has the purpose of compensating for tolerances in the length of the closing sliding valve. The over-expansion spring consists usually of the material of the closing sliding valve of course, it is also possible to use a metal over-expansion spring.

Figure 1B:
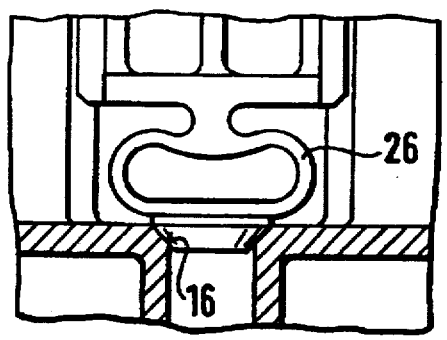

FIG. 1b shows a variation of such a spring. Here this over-expansion spring 26 is disposed directly on the valve seat 16.

Figure 1C:
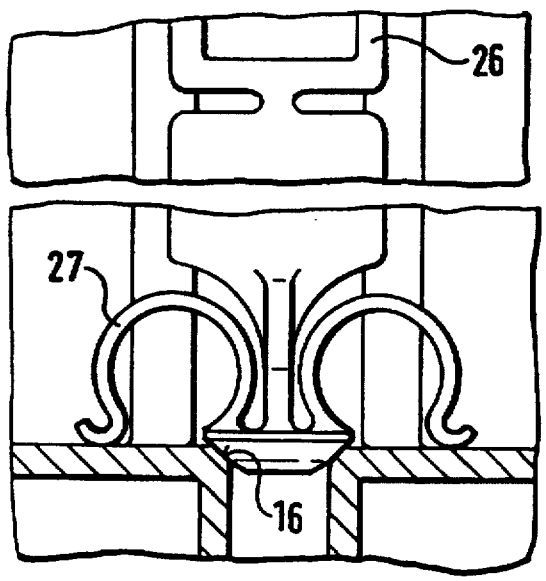

FIG. 1c represents a combination of an over-expansion spring 26 with a return spring 27. The return spring 27 is provided near the valve seat 16. The over-expansion spring is situated in the bridge area of the closing sliding valve.

Figure 1D:
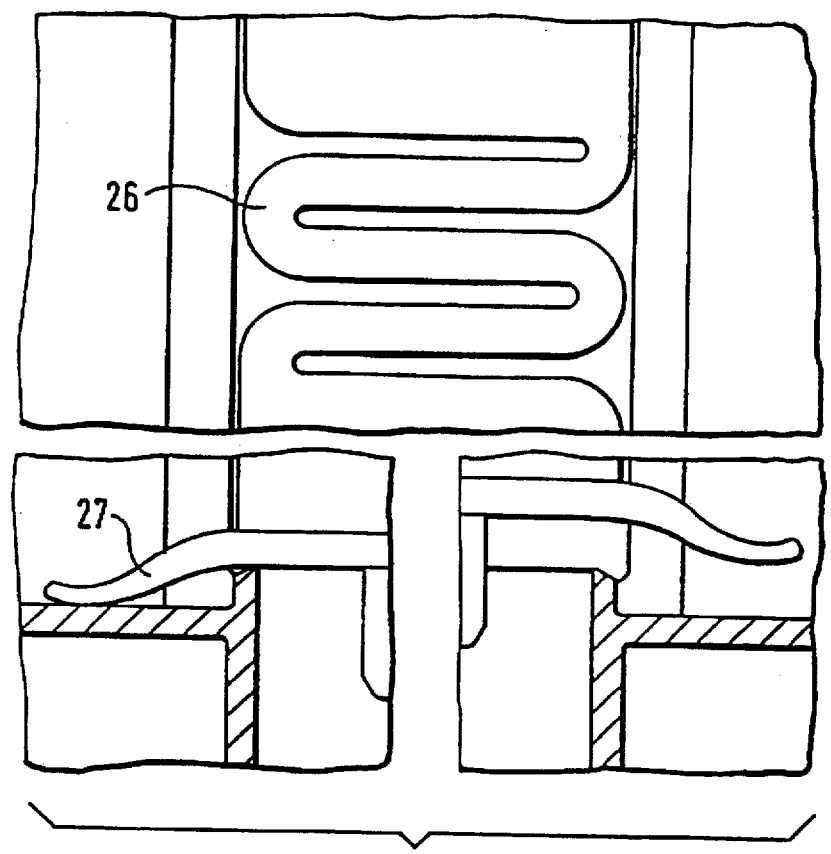

FIG. 1d shows another variation of an over-expansion spring. Here again, a return spring 27 is provided, and simultaneously forms the closure of the drain opening.

Figure 1E:
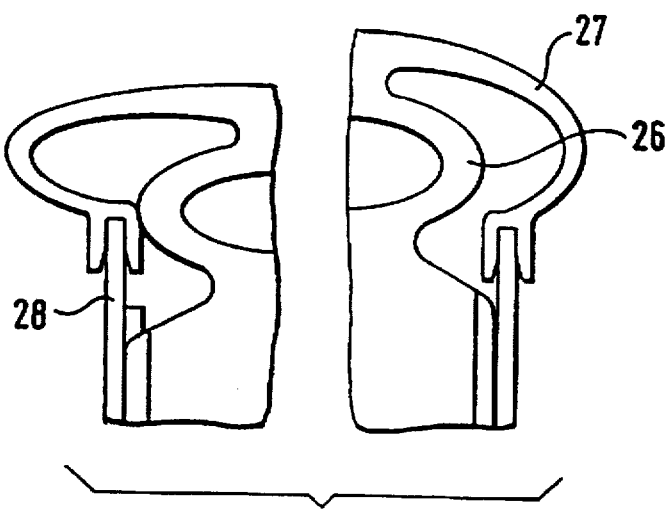

FIG. 1e shows a combination of over-expansion spring and return spring. The over-expansion spring 26 is disposed in the middle area. The return spring 27 thrusts against a housing portion 28 and exerts an upwardly directed force on the sliding closure valve. The left half section shows the closed position and the right half section shows the open position of the sliding closure valve.

Figure 2:
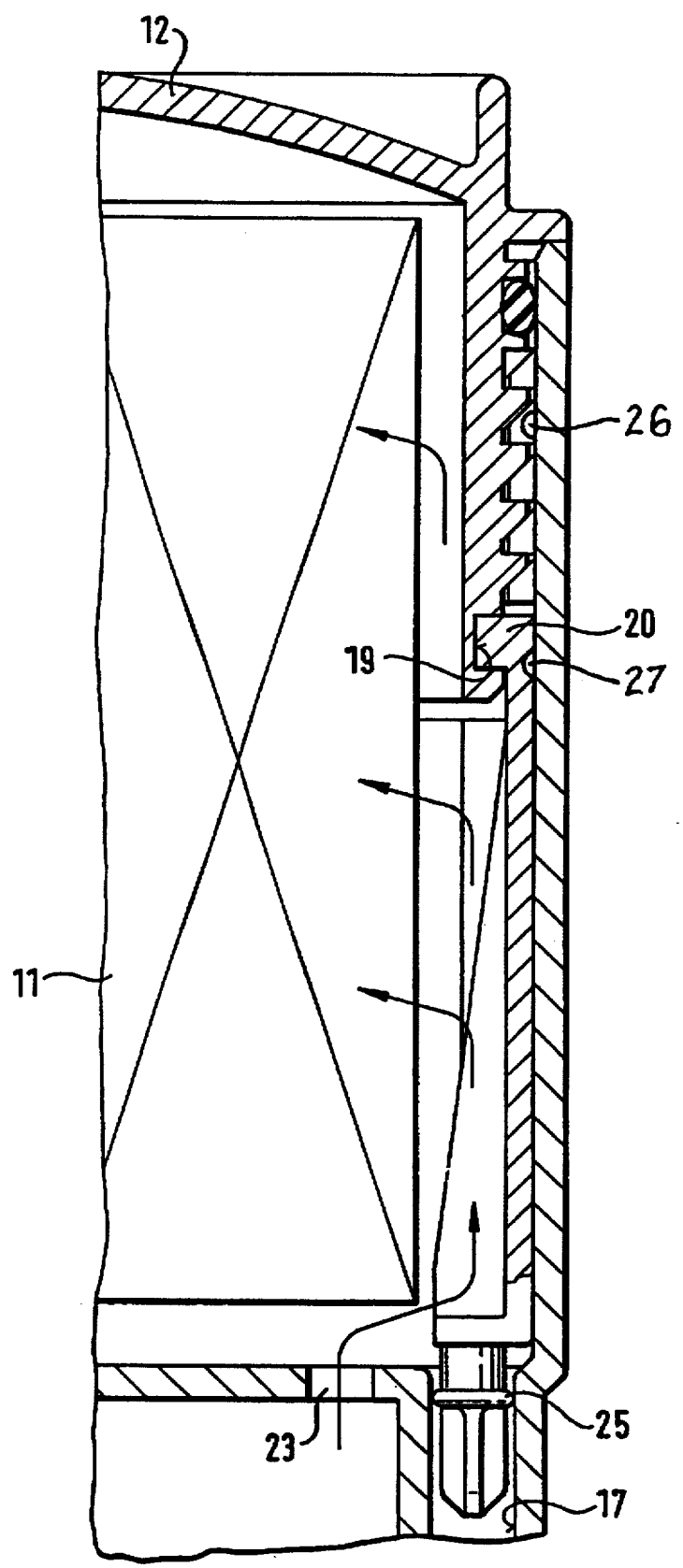
FIG. 2 is a sectional front view of another filter.

The variation of a sliding valve represented in FIG. 2 has a positively guided sliding valve. This valve closes an oil drain opening 17, where a sealing element is provided which functions within a range of axial positions. The oil drain opening 17 is provided with a sealing surface extending over a certain axial length. An O-ring 25 is fastened to the sliding valve. This O-ring 25 closes the oil drain opening when the O-ring is in contact with the sealing surface.

A groove 19 is disposed in the cover 12. This groove is engaged by a pin 20 of the sliding valve, so that the sliding valve is carried with the axial movement of the cover. In the closed position shown in FIG. 2, which corresponds to the 360° position shown in FIG. 3b, the oil drain opening is closed. When the cover is rotated, the sliding valve moves upward due to the thread pitch—the thread shown is a quadruple thread—and opens the oil drain Opening. Between the 360° position and the 180° position, the groove runs parallel to the horizontal plane. Beyond the 180° position the groove no longer runs parallel to the horizontal plane but parallel to the thread. On this slope the sliding valve no longer moves axially but remains in the open position already reached. Upon reaching the 90° position the cover can be removed. The oil in the filter housing drains out during the operation of opening the cover. When the sliding valve reaches the open position a catch means 26 can engage in recess 27 to hold the sliding valve in this position until the cover is replaced and the pin 20 of the sliding valve engages with the groove 19.

To assure that the cover will be installed in the correct position with respect to the sliding valve, the quadruple thread can be provided with different thread geometries, i.e., if one thread has a thicker profile than the three other threads this will assure that the cover can be placed on the filter housing in only one position with reference to the filter housing.

Figure 3A:
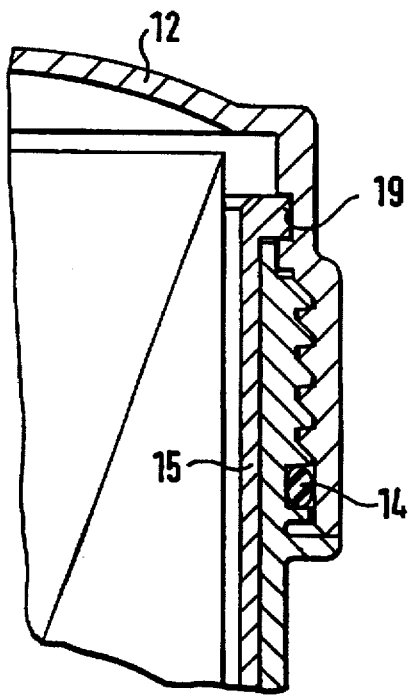
FIG. 3a is a sectional front view of a filter in an area of the cover.
Figure 3B:
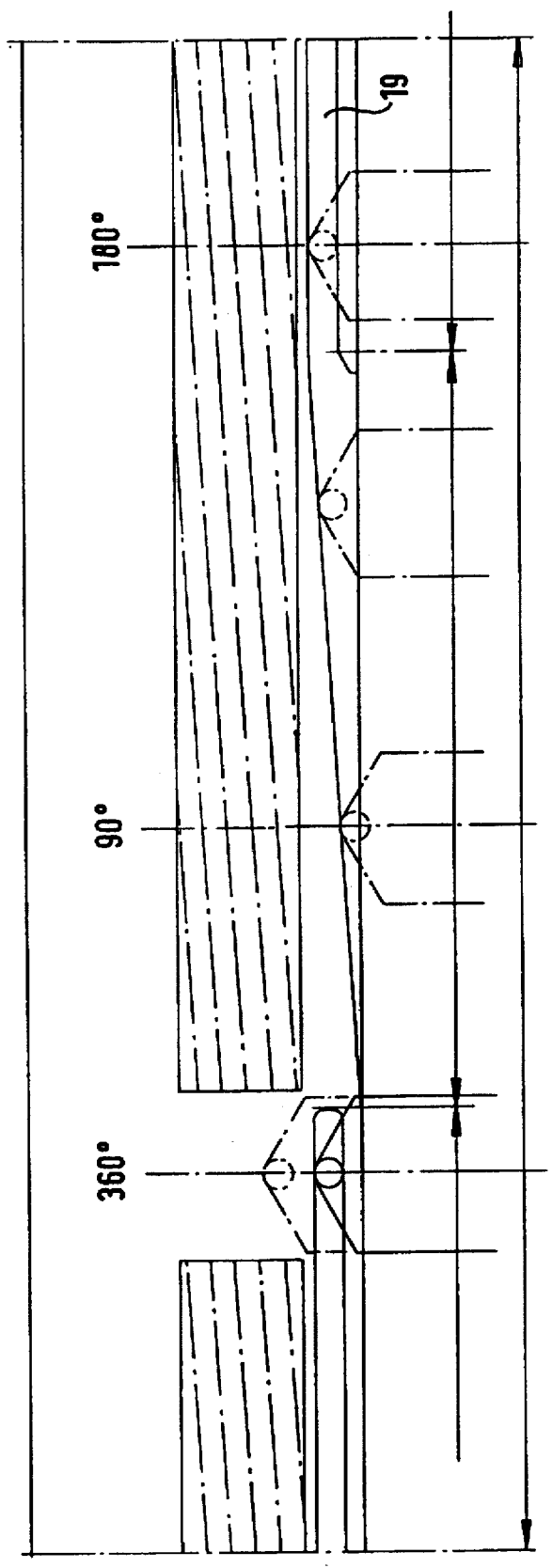
FIG. 3b shows the movement of a sliding valve in a groove of the cover.

FIG. 3a shows a variation of a cover with an inner thread. Here the sliding valve 15 enters a groove 19 in the upper area of the cover 12, and is likewise shifted axially according to the cover movement.

Figure 4:
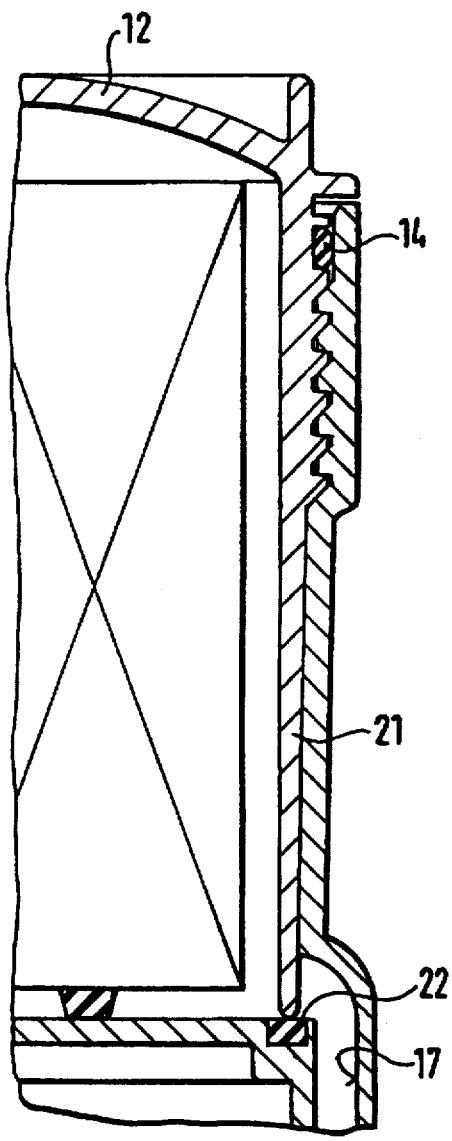
FIG. 4 is a view of a sliding valve which is an extension of the cover.

FIG. 4 shows an especially simple embodiment. Here the sliding valve is not a separate element but is disposed directly on the cover, i.e., the sliding valve is a extension 21 of the cover 12. This extension closes an oil drain opening 17 in the bottom part of the filter housing. As soon as the cover is rotated this oil drain opens, so that the oil can flow out. It is desirable for a sealing means 22 to be arranged at a lower side of the oil drain opening, such that the extension 21 contacts the sealing means to reliably seal the oil drain opening.

As in the preceding embodiments, an annular gasket 14 is provided directly beside the threads. When the cover is opened, the gasket 14 allows air to flow in over the threads, to help the oil to drain out reliably.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A filter for lubricating oil of an internal combustion engine comprising:

a filter housing having an access opening in an upper end thereof through which at least one filter element may be inserted into and removed from the housing, said housing including a bottom end portion and a longitudinal axis;

a cover arranged to close said access opening, wherein said cover is axially movable between a lower closed position and an upper open position;

an inlet opening in said housing for dirty oil to enter the housing;

an outlet opening in said housing for clean oil to exit the housing;

a drain opening in the bottom end portion of said housing, wherein said drain opening includes a valve seat defining an axial stop; and a closure element, means for mounting said closure element in an axially movable manner adjacent an inner wall of said filter housing with respect to said longitudinal axis, said closure element including an upper end which contacts the cover such that the closure element is moved to the lower closed position blocking the drain opening when the cover is closed, means for moving the closure element to the upper open position opening the drain opening when the cover is opened, said closure element including a lower end portion having a valve member for axially abutting the axial stop of said valve seat to block said drain opening, and spring means disposed axially between said upper end and said valve member, said spring means being axially resilient such that the closure element can assume a range of axial lengths when said valve member abuts the axial stop of said valve seat before the cover moved to said lower closed position.

2. A filter according to claim 1, wherein a threaded connection is provided between the cover and the housing.

3. A filter according to claim 1, wherein said means for moving the closure element to the upper open position comprises a spring which biases the closure element toward the cover and moves the closure element to the open position when the cover is opened.

* * * * *